United States Patent
Hettich et al.

(10) Patent No.: US 6,623,228 B1
(45) Date of Patent: Sep. 23, 2003

(54) THREAD-CUTTING SCREW

(75) Inventors: Ulrich Hettich, Schramberg (DE); Stefan Hettich, Schramberg/Sulgen (DE)

(73) Assignee: Ludwig Hettich & Company (DE)

( * ) Notice: Subject to any disclaimer, the term of this patent is extended or adjusted under 35 U.S.C. 154(b) by 0 days.

(21) Appl. No.: 09/830,274

(22) PCT Filed: Aug. 18, 1999

(86) PCT No.: PCT/EP99/06029

§ 371 (c)(1),
(2), (4) Date: Aug. 13, 2001

(87) PCT Pub. No.: WO00/28225

PCT Pub. Date: May 18, 2000

(30) Foreign Application Priority Data

Nov. 5, 1998 (DE) ...................................... 298 19 813 U

(51) Int. Cl.$^7$ ................................................ F16B 35/04
(52) U.S. Cl. ................................... 411/411; 411/387.4
(58) Field of Search ..................... 411/411, 412, 411/414, 386–387.4

(56) References Cited

U.S. PATENT DOCUMENTS

| | | | |
|---|---|---|---|
| 3,902,399 A | * | 9/1975 | Yotti |
| 4,439,077 A | * | 3/1984 | Godsted |
| 4,652,194 A | * | 3/1987 | Tajima |
| 4,842,467 A | * | 6/1989 | Armstrong |
| 5,110,245 A | * | 5/1992 | Hiroyuki |
| 5,188,496 A | * | 2/1993 | Giannuzzi |
| 5,674,035 A | * | 10/1997 | Hettich |
| 5,730,566 A | * | 3/1998 | Goodwin |
| 5,800,107 A | * | 9/1998 | Giannuzzi |
| 6,322,307 B1 | * | 11/2001 | Glover |
| 6,332,741 B1 | * | 12/2001 | Janusz |

FOREIGN PATENT DOCUMENTS

EP 623759 A1 * 11/1994

* cited by examiner

Primary Examiner—Flemming Saether
(74) Attorney, Agent, or Firm—Duane Morris LLP

(57) ABSTRACT

A thread cutting screw to be screwed into a predrilled hole in concrete, masonry, or the like is characterized in that the relationship between the load bearing thread surface AOn of the loaded thread flank, which surface is standardized to the load bearing thread length he and cut into the wall of the predrilled hole, and the nominal diameter db of the predrilled hole is as follows $$AOn = k\sqrt{db}$$

wherein k is a constant of which the value is $1 < k \leq 2.5$.

8 Claims, 2 Drawing Sheets

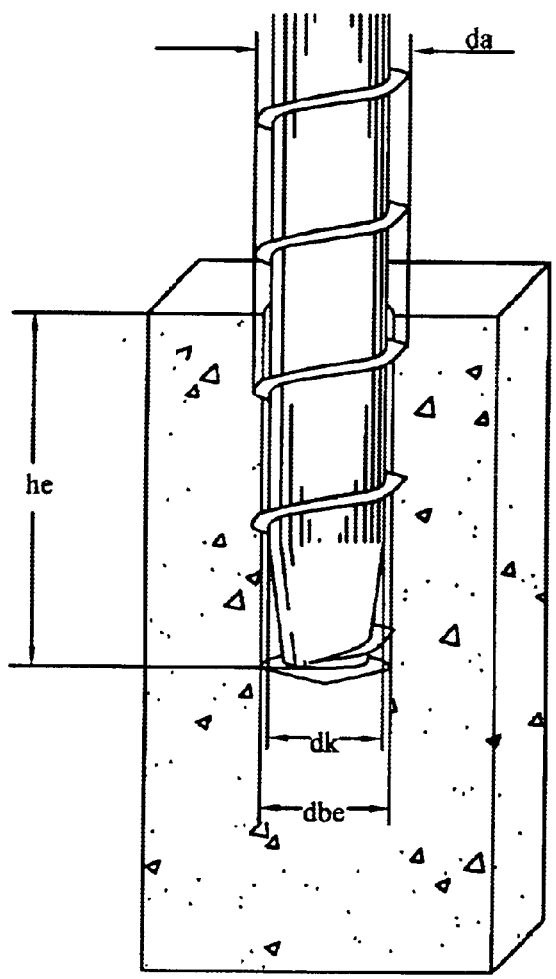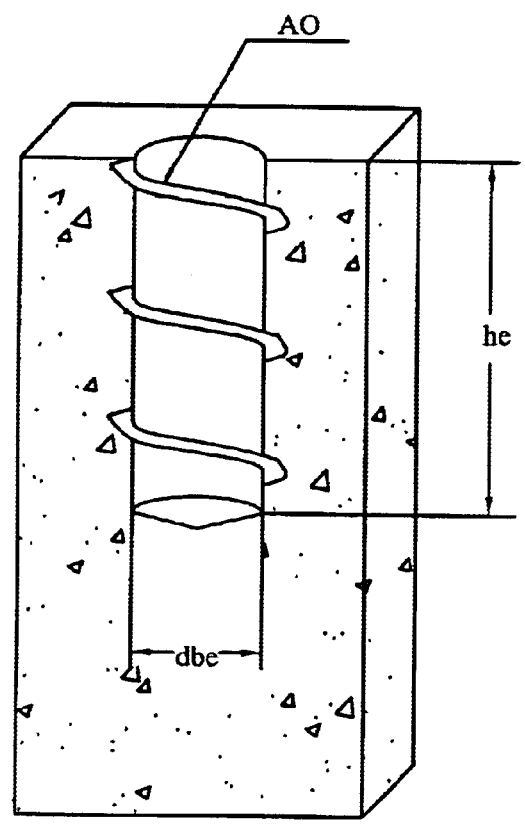
FIGURE 1                    FIGURE 2

THREAD-CUTTING SCREW

BACKGROUND OF THE INVENTION

The invention relates to a thread cutting screw to be screwed into a predrilled hole in concrete, masonry, or the like.

Such a thread cutting screw adapted to be screwed into concrete, masonry, or the like without a dowel is known from EP 0 623 759 B 1. The thread geometry in that case is defined by ranges of values for the ratio between outer diameter and core diameter, the ratio between outer diameter and thread pitch, and for the flank angle of the thread. The thread geometry thus is determined by three parameters which may be selected from the ranges claimed so as to obtain screws which will meet the particular requirements in practice.

As is well known, the load bearing capacity of anchorings in concrete can be described by a functional relationship between concrete strength 8w, load bearing thread length or anchoring depth he, and failure load F as defined by the following equation (1)

$$F = m \cdot he^{1.5} \cdot \sqrt{\beta w} \tag{1}$$

wherein m is a constant having a value of m=13 for uncracked concrete and m=7 for cracked concrete.

Although known thread cutting screws do reach these static loads, they cannot introduce corresponding loads into cracked concrete.

SUMMARY OF THE INVENTION

It is the object of the invention to devise a thread forming screw of the type described initially such that high load carrying capacity is achieved even in cracked concrete or masonry. This object is met, in accordance with the invention, where a screw is provided which, when used, permits the transferable loads in concrete or masonry in which cracks, especially dynamic cracks may occur, to reach the level of the load carrying capacity, both in uncracked and cracked concrete.

The invention provides the design engineer with a simple dimensioning aid for the thread configuration and offers the user a simple criterion of choice for selecting the proper screw size depending on the particular load circumstances.

The configuration of the thread of a screw takes into account that, in cracked concrete, only certain pressures can be transmitted between thread flank and concrete. This is based on the finding that the overall load bearing surface AO of the thread flanks in concrete or masonry required for introducing load must be proportional to the static failure load F according to equation (1).

$$AO = k'^{*} he^{1.5} \tag{2}$$

wherein k' is a constant.

The value of AO can be determined from the following relationship:

$$AO = \frac{da - dbe}{2} \cdot \frac{he}{p} \cdot \sqrt{\left(\frac{da + dbe}{2} \cdot \pi\right)^2 + p^2} \tag{3}$$

wherein
  da=outer thread diameter
  dbe=drill edge dimension of the drilling tool for producing the predrilled hole p=pitch.

A relationship between the diameters indicated, the pitch p of the thread, and the load bearing surface AO of the thread flanks can be established by equation (3). If one relates the entire load bearing surface AO to the load bearing thread length he, the result is a relationship between the standardized surface AOn and the load bearing thread length he with $$AO/he = AOn = k' \sqrt{he} \tag{4}$$

wherein k' is a constant and the dimension of the AOn value is given in mm. The thread length he is proportional to the diameter db of the predrilled hole. Equation (4), therefore, can be rewritten as $$AOn = k \sqrt{db} \tag{5}$$

wherein k is a constant having a value of $1 \leq k < 2.5$.

The preferred embodiment of the thread cutting screw according to the invention is one with which the pitch p of the thread fulfills the relationship $$p \leq 10 \cdot \frac{da - dbe}{2} \tag{6}$$

wherein da=the thread diameter and dbe=the drill edge dimension of a drilling tool for the predrilled hole.

In a practical embodiment it is preferred to select the core diameter dk of the thread by 0.2 to 1 mm smaller than the nominal diameter db of the predrilled hole.

The load bearing surface AO of the thread flanks is a function of the pitch p, the outer thread diameter da, and the drill edge dimension dbe, as indicated above in equation (3). Thus also the standardized surface AOn related to the load bearing thread length he is dependent on these factors p, da, and dbe.

A range of small pitch values is of particular interest for practical use of the invention. For this range, the relationship between the pitch p and the nominal bore diameter db is $$p \leq 5 \cdot \sqrt[3]{db \cdot k} \tag{7}$$

In the range of small pitch values satisfying equation (7), the k value may be selected while making full use of the range from $1 \leq k < 2.5$ irrespective of the varying outer thread diameters due to manufacturing tolerances.

The dependence of the load bearing thread surface AOn on the nominal bore diameter db depends on the magnitude of the thread flank angle. According to another modification of the invention, however, a thread angle alpha$\geq 5°$ is preferred.

If the thread is of unsymmetric design the partial flank angles, each measured with respect to a transverse plane E, have different values. However, the sum of these partial flank angles should also fulfill the relationship of alpha$_1$+alpha$_2 \geq 5°$.

A preferred range of flank angles used with the screw according to the invention, or the sum of the partial flank angles is 30° <alpha$\leq 50°$.

A range of from 1.75<k$\leq$2.0, especially a value of approximately k=1.75 is preferred for the constant k. This limited k range or the k value indicated have proved to be favorable in particular with screws having greater diameters.

Moreover, it is advantageous if the outer thread diameter da is designed to flare conically towards the screw head at a cone angle β of between 0° and 5°, at least over part of the axial extension of the screw, especially if the setting depths are great because with them the predrilled bores automatically become conical. Such conical flaring may be provided also for the core of the thread, either as an alternative to or together with the conical flaring of the outer thread diameter.

When loaded, the screw experiences its greatest expansion where it exits from the threaded bore. In order to curb the dangerous strains occurring there, particularly the notch stress, another advantageous embodiment of the screw according to the invention is formed with a thread profile which changes over continually from a sharp-edge basic profile to a round thread profile, at least over part of the axial extension of the screw. This round thread profile ends at the location of the greatest expansion of the loaded screw, namely at the transition from the thread to the shank of the screw.

BRIEF DESCRIPTION OF THE DRAWINGS

The invention will be described in greater detail below, by way of example, with reference to diagrammatic drawings, in which:

FIG. 1 is a perspective view of a screw 2 according to the invention threaded into a partly predrilled hole 1 in concrete or masonry, with the bore broken away;

FIG. 2 is an illustration of the predrilled hole 1 having a thread 3 cut by the screw 2, showing the hole after the screw has been threaded out of it but otherwise in the same presentation as in FIG. 1;

DETAILED DESCRIPTION OF THE INVENTION

The essential dimensions and sizes of the thread geometry explained above with reference to equations (1) to (5) are entered for better illustration in FIGS. 1 and 2.

In accordance with equation (5) developed above, the load bearing surf ace AO depends on one geometric parameter only, namely the nominal diameter db of the predrilled hole and on the value of the constant k which is selectable between numerical value 1 and numerical value 2.5.

This gives the screw design engineer a simple means of dimensioning the decisive sizes for the thread configuration, offering him a greater width of variation than the known screw described initially. The dimensioning within the range claimed for constant k always is made within the admissible load limits also in cracked concrete.

Figure 3:
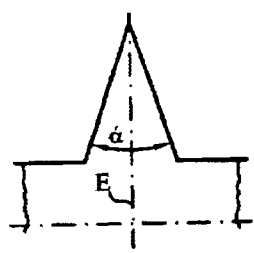
FIGS. 3 and 4 each show a tooth of the thread having flank angles of different design, as can be implemented with a screw according to the invention.

FIG. 3 is a part sectional elevation of a screw according to the invention, showing a tooth of the thread with flanks which are symmetrical to a transverse plane E. The flank angle alpha ($\alpha$) in this case is 50°. In practice values of alpha are above 5°, preferably lying in the range of between 30° and 50°.

Figure 4:
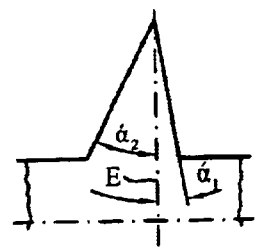

The thread tooth shown in FIG. 4 has flanks which are inclined at different angles alpha$_1$ and alpha$_2$ with respect to the transverse plane E so that the thread tooth is unsymmetrical with respect to the transverse plane E. The partial flank angle alpha$_1$ included between the plane E and the flank facing the screw-in direction is 10°, whereas the partial flank angle alpha$_2$ of the flank which faces the screw head is approximately 35°.

Also with this unsymmetrical thread tooth configuration, the sum of the flank angles alpha$_1$, alpha$_2$ preferably lies in the range between 30° and 50°.

Figure 5:
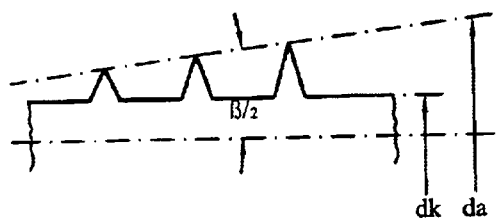
FIGS. 5 to 8 are cross sectional partial views of thread portions of different embodiments of screws according to the invention.
Figure 6:
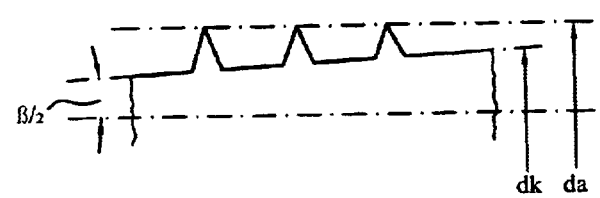
Figure 7:
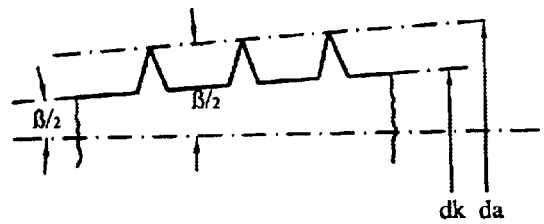

In the embodiments shown in FIGS. 5 to 7, at least across a portion, the thread portion of the screw is devised to have a conicity which increases towards the screw head. That is realized in different ways according to FIGS. 5 to 7:

In FIG. 5 the outer diameter da flares conically, while the core diameter dk remains constant. In other words, the depth of tooth increases continually towards the screw head, in the conical thread portion.

In the embodiment according to FIG. 6 the outer diameter da is constant in the conical range, too, while the core diameter dk flares conically.

In FIG. 7, finally, both the core diameter dk and the outer diameter da of the thread flare conically towards the screw head.

The cone angle in all cases lies in the range of $0° < \beta \leq 5°$.

Figure 8:
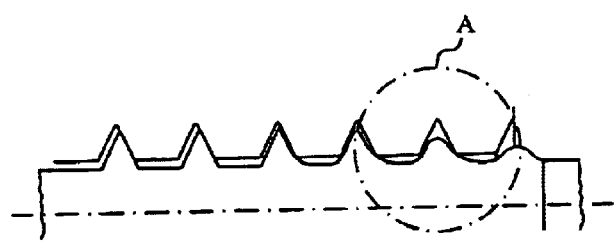

The greatest elongation of the screw occurs in the region where the thread exits from the corresponding thread bore. In this region, the notch stresses in particular become greatest. For This reason the thread is rounded progressively in the direction of the screw head (not shown) in the zone marked A in the embodiment shown in FIG. 8, at the same time, being flattened. This is effective to reduce the peaks of notch stresses, particularly great in this area with screws which are subject to repeated reversed stresses. Fatigue failure is prevented hereby.

The features disclosed in the above specification, claims, and drawings may be essential to the implementation of the invention in its various modifications, both individually and in any combination.

What is claimed is:

1. A thread cutting screw in combination with a mass of concrete or masonry defining a predrilled hole with a nominal diameter of db and a maximum hole edge dimension of dbe, wherein the thread cutting screw is adapted for screwing into said predrilled hole, the screw comprising a standardized load bearing surface AOn, where AOn is an overall load bearing surface AO divided by a load bearing thread length he, wherein the standardized load bearing surface AOn is related to the predrilled hole diameter db according to the following:

$$AOn = k\sqrt{db};$$

where k is a constant having a value of $1 \leq k \leq 2.5$.

2. The combination of claim 1, wherein starting from a sharp edged basic profile, the thread profile changes over continually into a round thread profile at least over part of the axial extension of the screw, said round thread profile ending at the location of the greatest elongation of the loaded screw, namely at the transition of the thread into the screw shaft.

3. The combination of claim 1 comprising a thread pitch p, wherein the pitch p is related to a outer thread diameter da and the maximum hole edge dimension for the predrilled hole dbe according to the following:

$$p \leq 10 * \frac{da - dbe}{2}.$$

4. The combination of claim 1, comprising a thread pitch p, wherein the pitch p is related to the diameter of the predrilled hole db according to the following;

$$p \leq 5\sqrt[3]{db \cdot k}.$$

5. The combination of claim 1, comprising a thread flank angle $\alpha$ according to the following:

$$\alpha \geq 5°.$$

6. The combination of claim 5, comprising partial flank angles according to the following;

$$\alpha_1 + \alpha_2 \geq 5°;$$

where $\alpha_1$ and $\alpha_2$ are partial flank angles.

7. The combination of claim 1, comprising a thread flank angle $\alpha$ or a partial flank angle $\alpha_n$ according to the following:

$$30° \leq \alpha, \alpha_n \leq 50°.$$

8. The combination of claim 1, wherein the constant k is selected from the range $1.75 \leq k \leq 2$.

* * * * *